(12) United States Patent
Kurt-Elli

(10) Patent No.: US 7,134,344 B2
(45) Date of Patent: Nov. 14, 2006

(54) CONTROL METHOD AND APPARATUS

(75) Inventor: Hilmi Kurt-Elli, Derby (GB)

(73) Assignee: Rolls-Royce plc, London (GB)

( * ) Notice: Subject to any disclaimer, the term of this patent is extended or adjusted under 35 U.S.C. 154(b) by 196 days.

(21) Appl. No.: 10/974,739

(22) Filed: Oct. 28, 2004

(65) Prior Publication Data

US 2005/0092087 A1   May 5, 2005

(30) Foreign Application Priority Data

Oct. 30, 2003  (GB)  ................................. 0325322.6

(51) Int. Cl.
*G01M 7/00* (2006.01)

(52) U.S. Cl. .......................................... 73/664; 73/808

(58) Field of Classification Search .................. 73/664, 73/808

See application file for complete search history.

(56) References Cited

U.S. PATENT DOCUMENTS

| | | | |
|---|---|---|---|
| 3,916,699 A * | 11/1975 | Moran et al. .................. | 73/623 |
| 4,470,025 A * | 9/1984 | Baker ........................... | 331/178 |
| 5,299,459 A | 4/1994 | Underwood | |
| 5,847,259 A | 12/1998 | Hu | |
| 6,023,975 A * | 2/2000 | Willis .......................... | 73/579 |
| 2004/0262925 A1* | 12/2004 | Seki et al. ................. | 290/40 A |

FOREIGN PATENT DOCUMENTS

JP   5802490415 A  *  2/1983

\* cited by examiner

*Primary Examiner*—Hezron Williams
*Assistant Examiner*—Rose M. Miller
(74) *Attorney, Agent, or Firm*—W. Warren Taltavull; Manelli Denison & Selter PLLC

(57) ABSTRACT

An adaptive control method is provided with particular relevance in methods which use a varying input frequency for analysis of an oscillatory response of a system, such as sine sweep testing. In one aspect the method includes the steps of applying a drive force having at least one sinusoidal component to said system, the frequency of the sinusoidal component being changed with time; and measuring an oscillatory response of said system; the method further including the step of providing a control signal based on at least a comparison between the frequencies of the sinusoidal component and the oscillatory response, wherein the rate at which the frequency of the sinusoidal component is changed is adjusted according to the control signal, so as to adapt the rate of frequency change to the region of the response spectrum being analyzed. A test apparatus capable of carrying out the methods of the invention is also provided.

11 Claims, 5 Drawing Sheets

CONTROL METHOD AND APPARATUS

The present invention relates to a control method. It is particularly, but not exclusively, related to a method for adaptive control of sine sweep testing or of other methods which use a varying input frequency.

Vibration tests using sinusoidal inputs are conducted on a wide range of structures and devices, for example in order to determine frequency response functions, transmissibility measurements or fatigue testing.

At its most basic, the sine sweep test is conducted by generating a sinusoidal drive signal whose frequency is varied over the desired frequency range of the test. One or more responses of the system to the drive signal are measured over the frequency range of the test. Some tests may require multiple sweeps of the frequency range, and these sweeps may be both up and down.

When conducting sine sweep tests, selection of the sweep rate (i.e. the rate of change of the frequency of the drive signal) is important. Inappropriate sweep rates may result in inaccuracies, for example in detection of resonant peaks and in estimating damping, as well as wasted test time spent traversing unimportant parts of the frequency spectrum.

Currently the methodology used to select the correct sweep rate is to repeat the testing at successively lower rates until measurements become consistent, i.e. until the latest set of measurements are sufficiently similar to the previous result obtained with a different sweep rate. However, this can result in several sweeps of the full frequency range being necessary to obtain a single test result.

The sine-sweep tests described above may be carried out using a sinusoidal component which is smoothly and continuously varied. Alternatively, similar testing can be carried out using stepped sine tests. In such tests, the frequency of the sinusoidal drive signal is increased in a series of discrete steps across the frequency range.

Stepped sine tests have been developed in which the response and input amplitudes are compared in order to detect when the step interval is excessive and adjust the step interval accordingly.

At its broadest the present invention provides an adaptive method for controlling the rate of change of a driving frequency applied to an oscillatable system.

In general terms, the control method comprises: applying a driving frequency to the system, the frequency being changed with time; measuring an oscillatory response of the system; comparing the driving frequency and the frequency of the oscillatory response; and adjusting the rate at which the driving frequency changes according to the comparison.

A first aspect of the present invention relates to an adaptive method suitable for controlling the sweep rate of a sine sweep test.

Thus, the first aspect of the present invention may provide a method of analysing an oscillatable system including the steps of: applying a drive signal having at least one sinusoidal component to said system, the frequency of the sinusoidal component being changed with time; and measuring an oscillatory response of said system; the method further including the step of providing a control signal based on at least a comparison between the frequencies of the sinusoidal component and the oscillatory response, wherein the rate at which the frequency of the sinusoidal component is changed is adjusted according to the control signal, so as to adapt the rate of frequency change to the region of the response spectrum being analysed.

The comparison between the frequencies of the sinusoidal component and the oscillatory response may involve calculating a frequency difference between them.

Large values of a frequency difference calculated in this manner may indicate that the rate at which the frequency of the sinusoidal component of the drive signal is being changed (the sweep rate) is too high near the resonant frequency. Conversely, small values of a frequency difference calculated in this way may indicate that the instantaneous conditions are very close to the steady state harmonic response condition that the test is trying to emulate and that the sweep rate may be increased.

The frequency difference thus calculated may therefore be used to automatically control the sweep rate and thereby improve the accuracy of the sine sweep test.

The frequencies referred to above may be instantaneous frequencies calculated from short sections of the response or the drive signal. The frequency of the sinusoidal component may come directly from the drive signal, in which case its frequency will be already known. Alternatively, and particularly in relation to mechanical systems, a measurement of a drive force applied as a result of the drive signal may be used to obtain the frequency of the sinusoidal component, which may be calculated in a similar manner to the frequency of the response. This use of a measurement of driving force in the frequency calculations may be preferable depending on characteristics of the test equipment, fixtures and structure.

In some cases the response will not be narrowband, for example due to noise or non-linear components in the response. In these cases it may be necessary to pre-process the response prior to determining its frequency for the purposes of providing the control signal. Such pre-processing may involve narrow bandpass filtering around the drive frequency.

The sinusoidal component of the drive signal may be varied continuously and smoothly as in a sine-sweep test, or in discrete steps as in a stepped sine test.

The method of the present invention may also be applied to so-called multi-sine sweep tests. This is a modification of the standard sine sweep test where the drive signal comprises a superposition of a plurality of sinusoidal signal components with each component being swept across a defined frequency range. When using such a drive signal, the present invention may determine multiple control signals, for example one for each component of the drive signal. These control signals may then be used to independently control the sweep rate of each individual component in the drive signal.

In order to obtain multiple control signals, the overall response may be bandpass filtered around the frequency of each component of the drive signal. The control signals may then be obtained by calculating frequency differences between each component of the drive signal (or force if available) and the response in the same frequency band.

In some embodiments, there may be more than one measurement of the response of the system. For example, in a mechanical system, both the strain and the acceleration of the structure may be measured. Alternatively, the same response property (strain, etc.) may be measured in different parts of the system. In such embodiments, the method may make use of one or more of these response measurements when calculating control signals.

In some embodiments, the control signal(s) which are provided may be calculated in a similar manner to those calculated from a single response measurement, but using a combination of, or a selection from, these response measurements instead. Such combinations or selections may include the average value of a comparison, or the largest or smallest value of a comparison.

For example, multiple frequency differences may be calculated, one between each response measurement and a sinusoidal component of the drive signal. The step of providing the control signal may then further include identifying the response which has the greatest frequency difference with the sinusoidal component in a specified control loop period and basing the control signal on that difference. This may maximise the sensitivity of the method for detecting modes of the system.

Alternatively, the step of providing the control signal may further include calculating an average of the frequency differences (or of the absolute values of the frequency differences) between the sinusoidal component and the responses in a specified control loop period and basing the control signal on that average. This may be desirable if the measurements have high noise levels.

The systems analysed by the method of this aspect may be mechanical or electrical. In particular embodiments, the systems are gas turbine engines or components thereof.

Another aspect of the present invention provides a test apparatus for carrying out the method of the above aspect.

In particular, this aspect may provide a test apparatus for analysing an oscillatable system, the apparatus including: a vibration controller for applying a drive signal to a system under test, the drive signal having at least one sinusoidal component which is changeable with time; a sensor for attachment to the system in order to measure an oscillatory response of said system; and a comparator which is adapted to provide a control signal to the vibration controller, the control signal being based on at least a comparison between the frequencies of the sinusoidal component and the oscillatory response, wherein the rate at which the frequency of the sinusoidal component is changed is adjustable according to the control signal, so as to adapt the rate of frequency change to the region of the response spectrum being analysed.

Furthermore, preferred or optional features of the method of the previous aspect may be embodied in corresponding preferred or optional features of this aspect.

Embodiments of the present invention will now be described in relation to the accompanying Figures, in which:

FIG. 1 shows an amplitude response profile, with respect to time, of a system subjected to sine sweep testing, and shows resonant amplitude behaviour as the forcing frequency sweeps through the bandwidth encompassing a natural frequency.

FIG. 2 shows the frequency of the response (continuous line) and the frequency of the excitation (marked points) with respect to time, corresponding to the sweep shown in FIG. 1. FIG. 3 is an expanded plot of FIG. 2 over a smaller time region when the excitation sweeps through the resonant portion of the response.

Figure 1:
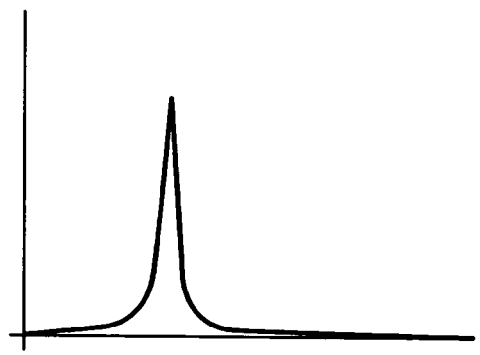
FIG. 1 shows an amplitude response profile with respect to time.
Figure 2:
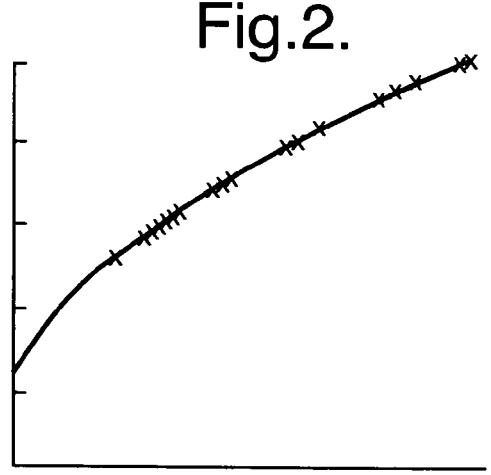
FIG. 2 shows the frequency of a response (white trace) and force excitation (black trace) with respect to time for the sweep of FIG. 1.
Figure 3:
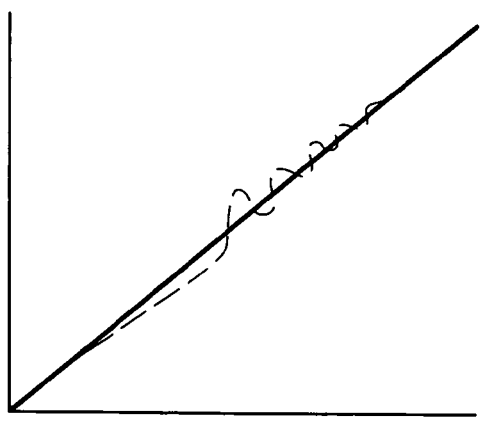
FIG. 3 is an enlarged portion of FIG. 2 over the time region when the excitation sweeps through resonance.

FIG. 3 shows that noticeable differences exist between the frequency of the excitation and the response at and around the resonant portion of the response. A control signal may be formed based on a comparison between the drive or force signal and the response signal. For example, if the sweep rate is too high, the difference between these two signals will be relatively large. Conversely, very similar signals indicate that the sweep rate may be increased without affecting the accuracy of the response measurement. The control method of embodiments of the present invention is based on this principle, and adjusts the sweep rate accordingly.

Figure 4:
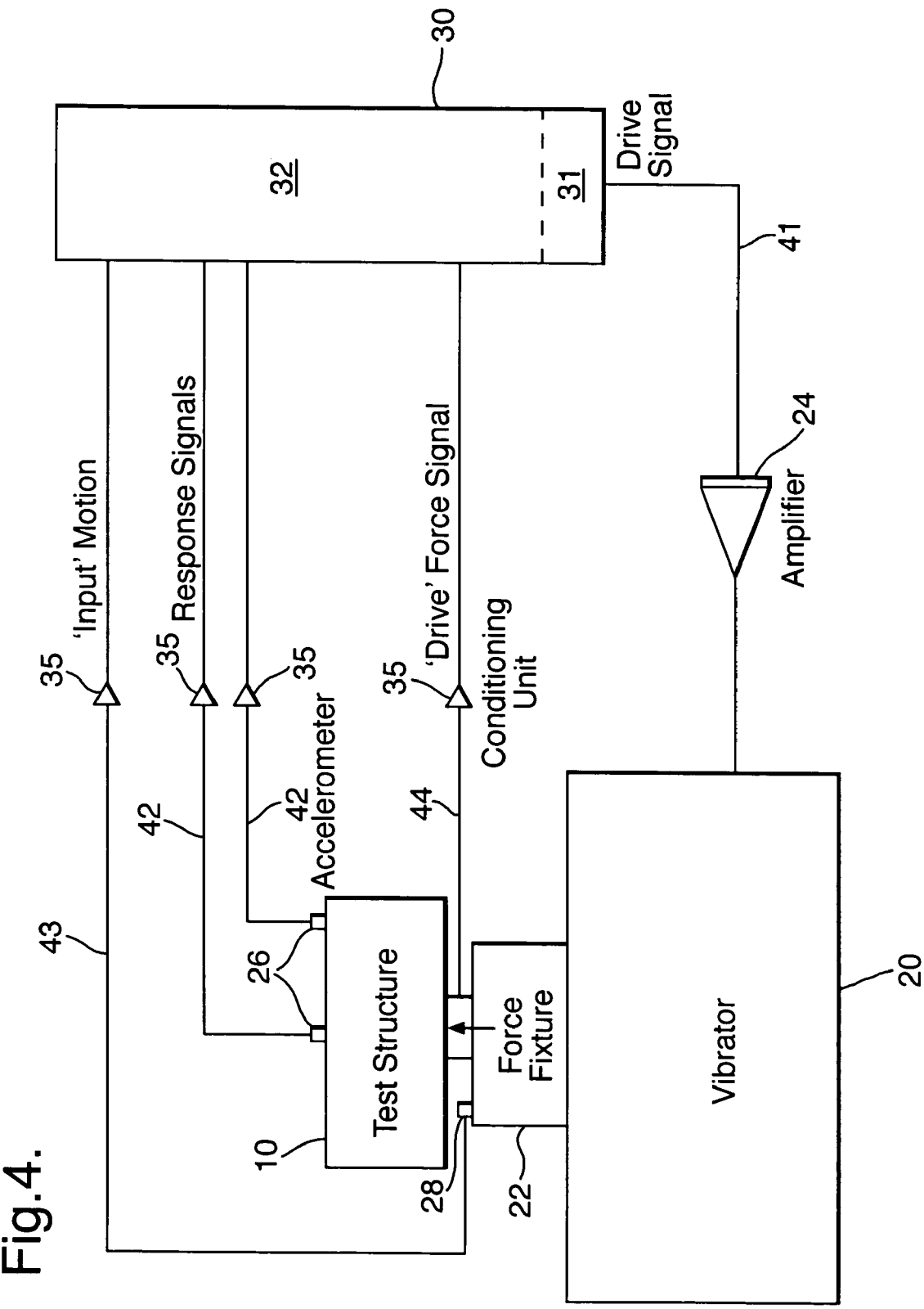
FIG. 4 shows an arrangement of a system test apparatus according to an embodiment of the present invention.

FIG. 4 shows an arrangement of a system test apparatus according to an embodiment of the present invention. A structure 10 under test, which may, for example be an engine, such as a gas turbine engine, or a component thereof, is attached to fixture 22, which is attached to vibration source 20. Vibration source 20 is driven by drive signal 41 from a vibration controller 31 which forms part of system control unit 30. Drive signal 41 may be amplified in amplifier 24.

One or more sensors (two are shown in FIG. 4) 26 are mounted on test structure 10. These sensors may be accelerometers, strain gauges, etc. Response signals 42 pass from the sensors 26 to a comparator 32 which also forms part of the system control unit 30. The comparator 32 also receives input signal 43 from a sensor 28 mounted on the fixture 22, which measures the input motion, and drive force signal 44, which contains information about the force applied by the vibration source 20, for example the frequency of the driving force.

All of the sensor signals 42–44 provided to the comparator 32 pass through conditioning units 35, which may filter, or otherwise pre-process, the signals.

In other embodiments one or both of the drive force signal 44 and the input motion signal 43 (and corresponding sensor 28) may not be present. In those embodiments the drive signal 41 is used as a reference signal.

The sine sweep starts at the lowest frequency of interest, and with a predetermined initial rate of change of the drive frequency (angular frequency rate/sweep rate). This rate is limited to values within a defined range, the range being set to ensure good adaptive control performance.

The sensors 26 measure the response of the system to the drive force, which may be of displacement, velocity, acceleration, strain, etc. Any of the drive signal 41, the input signal 43 or the drive force signal 44 may be used as a reference signal by the comparator 32.

Figure 5A:
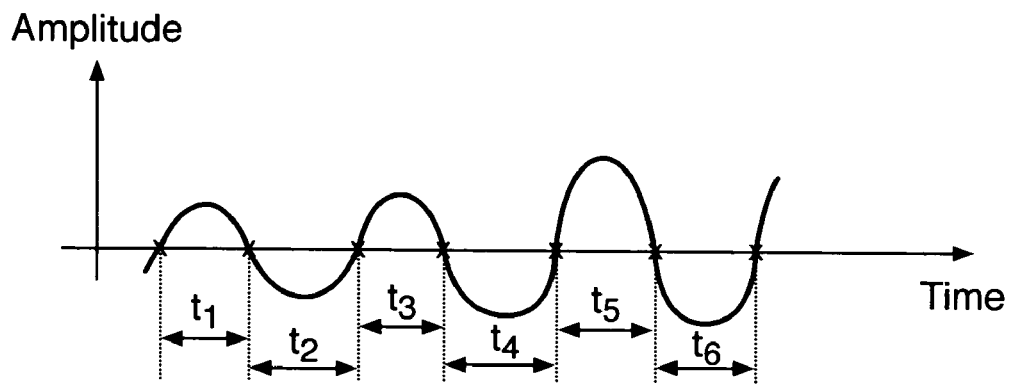
FIGS. 5a to 5c show, respectively, a narrowband response or measured component of the drive force, instantaneous time separation data derived from the signal shown in FIG. 5a, and instantaneous frequency data derived from that signal.

Both reference and response signals will normally be narrowband, for example as shown in FIG. 5a. However, if there is significant noise or non-linear response components in any of the signals, these are filtered in the system control unit 30 or in separate conditioning units 35, which carry out narrow bandpass filtering around the drive frequency. Other pre-processing may also be performed at this stage.

Figure 5B:
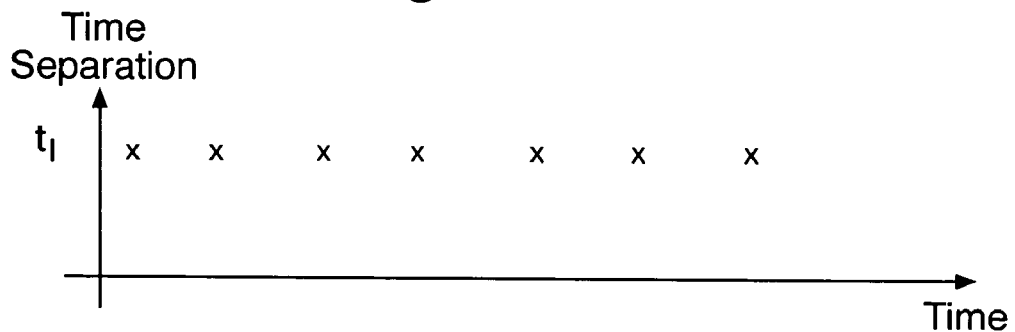
Figure 5C:
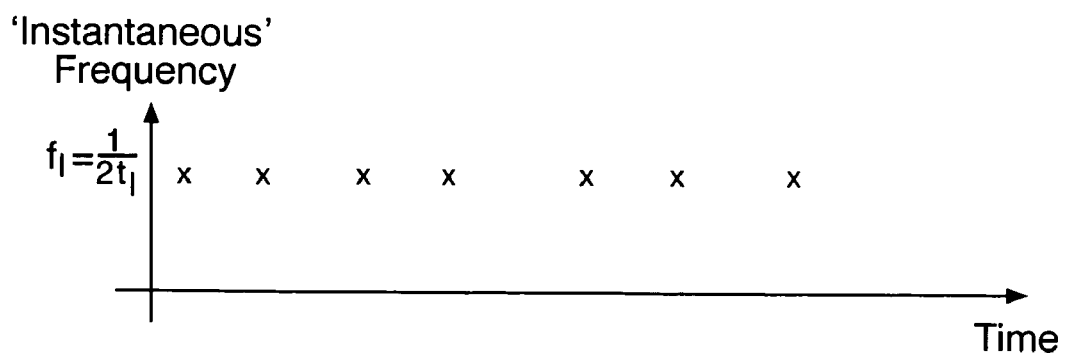

From this data, the zero crossing points can be determined, yielding an instantaneous time separation (FIG. 5b) or an instantaneous frequency (FIG. 5c). Note that the perturbations within the small time sample shown are generally not significant to be noticeable on the overall plot of the time separation or instantaneous frequency. Alternatively a curve-fitting approach may be used to obtain an instantaneous time separation or frequency function.

The frequency of the reference signal and of the response signal may be averaged over a predetermined length of time (or a predetermined number of oscillations) to prevent single outlier points affecting the reading.

The comparator 32 calculates a frequency difference by subtracting the reference frequency from the response frequency. If the only distinction which is required is between large frequency differences and small frequency differences, then the absolute value of the result may be taken.

This frequency difference is then used by the comparator 32 to provide a control signal to the vibration controller 31 causing it to adjust the drive signal and hence the sweep rate. If the value of the frequency difference is lower than a predetermined level, then the rate is increased; if it is higher, then the rate is reduced.

In alternative methods where a stepped sine test is being performed, the frequency difference may be used to adjust the frequency step.

Figure 6:
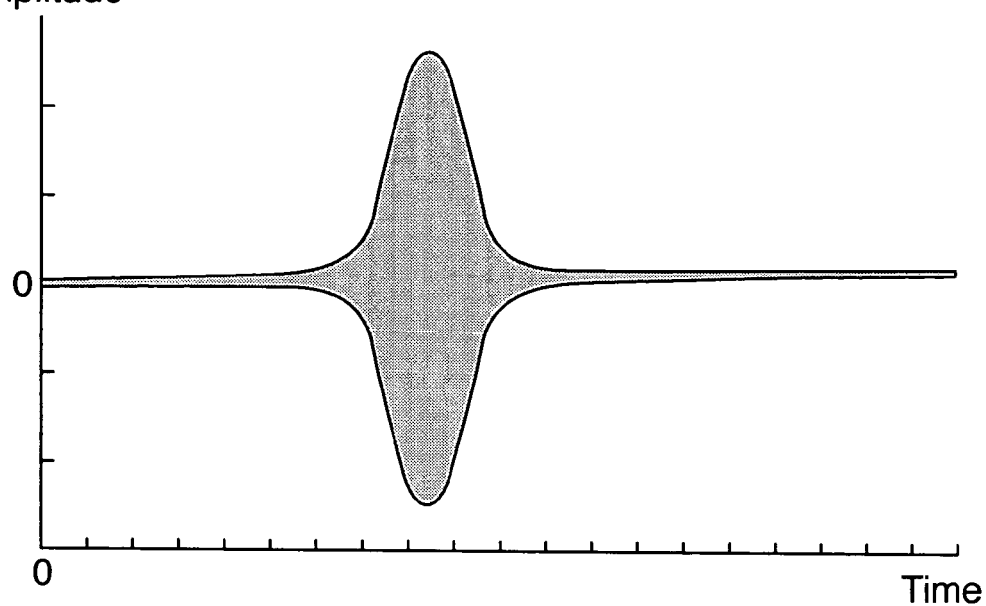
FIG. 6 shows the amplitude response of a simulated system undergoing analysis by a method according to an embodiment of the present invention.
Figure 7:
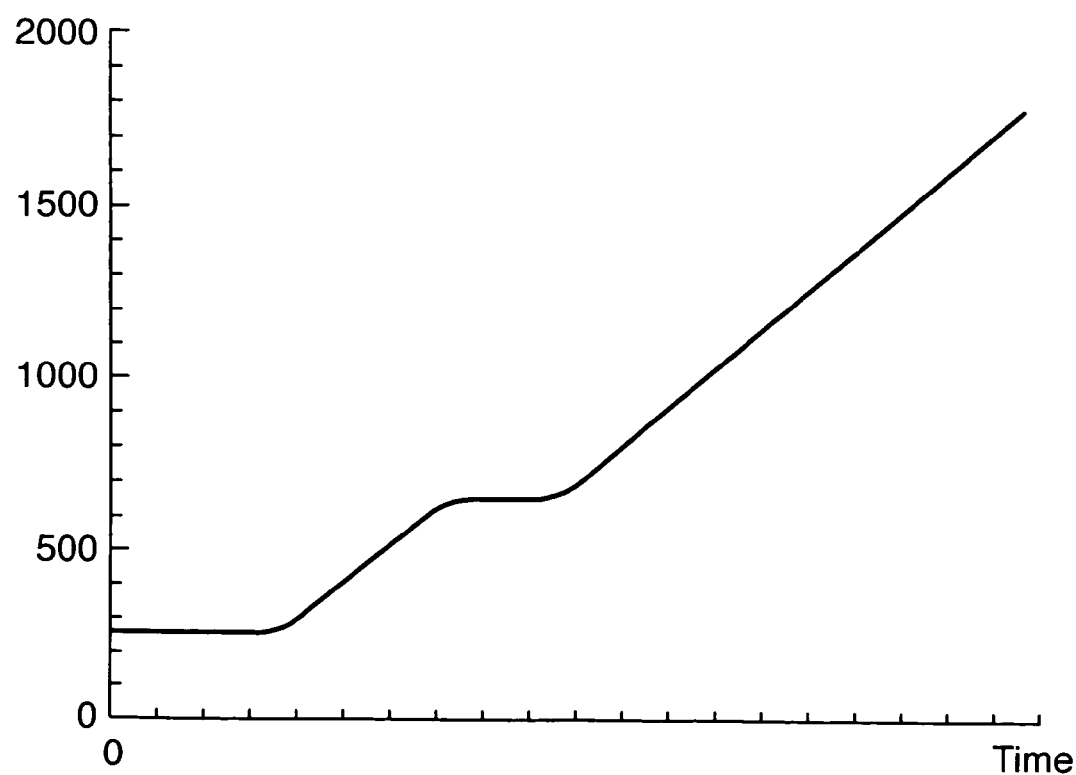
FIG. 7 shows the drive angular frequency of the drive force of the method according to an embodiment of the present invention.
Figure 8:
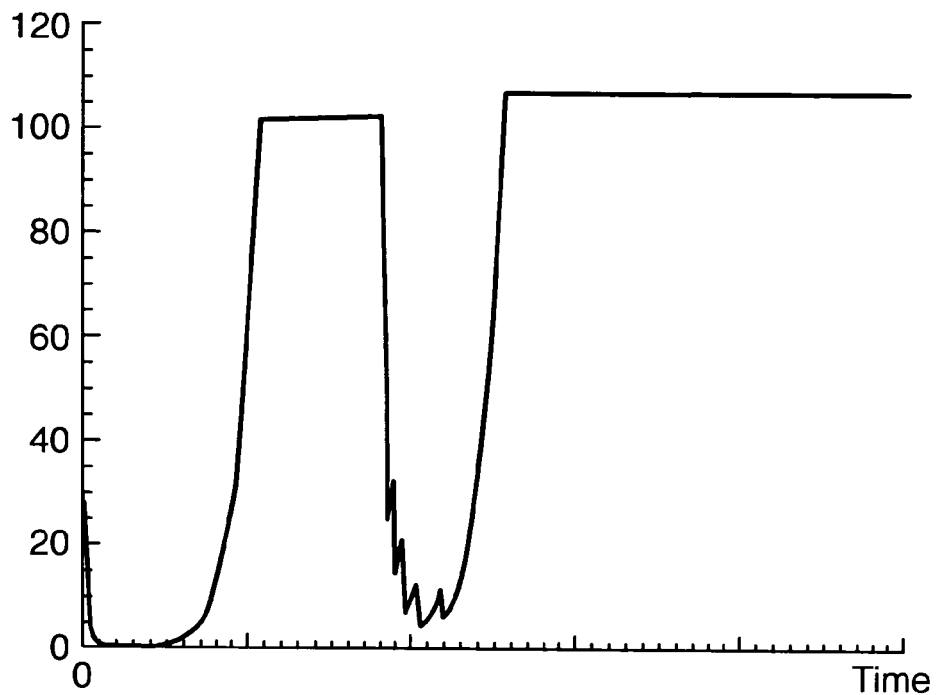
FIG. 8 shows the angular frequency rate of the drive force of the method according to an embodiment of the present invention.

FIGS. 6–8 demonstrate this method of control in a simulated situation, showing respectively the amplitude response, drive angular frequency and angular frequency rate with respect to time.

The simulation test case has the following parameters:
Time interval for discrete simulation: 1/5000 s
Simulation period: 20 s
Control loop period: 1/25 s
Natural frequency: 100 Hz
Damping, Q: 50
Sweep start frequency: 40 Hz
Initial angular frequency rate: 50 rad/s$^2$
Angular frequency sweep rate limits: [0, 100] rad/s$^2$ In this simulation, the control strategy simply reduces the angular frequency sweep rate by a factor of 1.5 when the rate is judged to be too high, and increases it by a factor of 1.1 if it is judged to be too low. To do this, the control strategy calculates the ratio of the response angular frequency to the drive angular frequency at the end of each control loop. This ratio is preferably kept equal to 1. Therefore when this ratio differs from 1 by more than 0.001 in either direction (i.e. the absolute value of the difference is >0.001), the sweep rate is considered to be too high and reduced accordingly. Conversely, if this ratio differs from 1 by less than 0.001, the sweep rate is increased. In both cases the sweep rate is constrained by the angular frequency sweep rate limits of [0, 100] rad/s$^2$, and cannot be adjusted so as to be outside those limits.

Other control strategies will be readily apparent to one skilled in the art. Such strategies may provide more levels of control or be adapted to work with alternative control signals. A single test apparatus may be capable of using several control strategies. The control strategy to be used may be selected by the user on the basis of one or more of: the test to be carried out, the desired accuracy and the desired speed of the test.

FIG. 6 shows that the simulated system goes through a resonant portion which is flanked on either side by non-resonant portions.

FIGS. 7 and 8 shows how the angular frequency and the rate of change of angular frequency vary over the course of the simulation based on the above control strategy. The initial changes seen in FIG. 8 are caused by start-up transients, and are followed by an increase to the maximum rate of change in the regions where there is little response from the simulated system. A sharp reduction in the rate to accurately scan the regions where the response becomes resonant then occurs, followed by an increase back to the maximum rate once the resonant portions have been passed.

The same control principles may be applied when there are a plurality of concurrent response measurements. Multiple frequency differences are calculated (e.g. one for each response measurement) and the control strategy may choose one of those (for example the largest), or some combination (for example the average). Taking the largest frequency difference using this control strategy results in the most accurate testing, since the rate is more likely to be reduced. However, this may result in a slower test than is desirable, and may be particularly susceptible to noise in the response signals since a single noisy measurement can cause the rate to reduce. Alternative choices may therefore be made.

Figure 9:
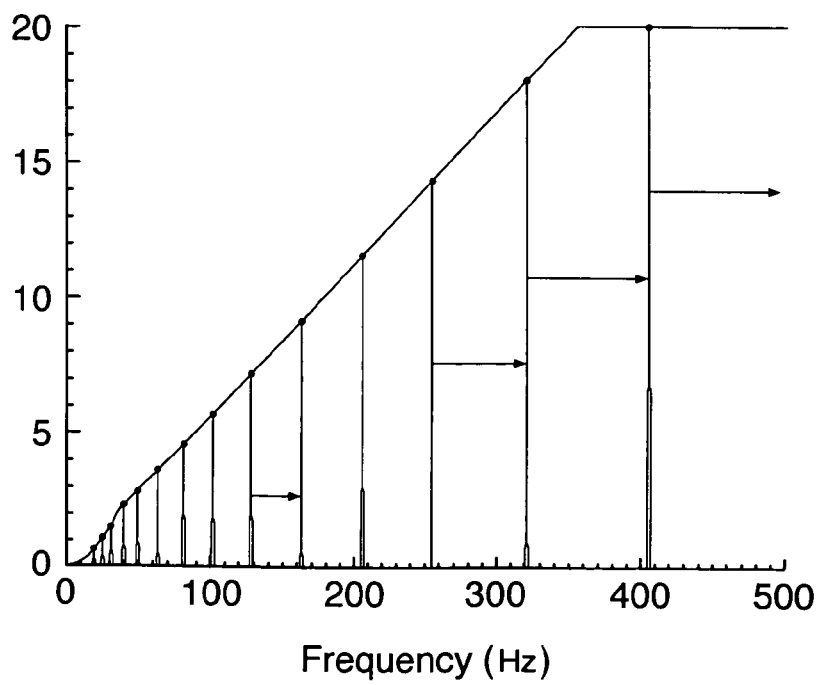
FIG. 9 shows a spectrum analyser output for a drive force used in multi-sine sweep testing.

The methods described above can also be used in multi-sine sweep testing. FIG. 9 is a spectrum analyser output for a reference or drive signal as used in this type of test. A number of sinusoids of different frequencies are used to simultaneously excite the structure under test. Each sinusoid sweeps through a predetermined frequency range so that when all the sweeps have been carried out, the entire frequency range of interest has been swept (this need not be a continuous range of frequencies). The individual sinusoids may also be controlled to conform to a frequency dependent amplitude profile.

The response signals are filtered around the frequency of each component of the drive signal, and the resulting plurality of filtered response signals processed to give instantaneous frequency values as described above. From these, multiple frequency difference signals are calculated (at least one per component) and these are used to independently control the sweep rate of each component of the drive signal.

The methods of using multiple response signals can also be used in the multi-sine sweep test.

I claim:

1. A method of analysing an oscillatable system including the steps of:
    applying a drive signal having at least one sinusoidal component to said system, the frequency of the sinusoidal component being changed with time; and
    measuring an oscillatory response of said system,
    the method further including the step of:
    providing a control signal based on at least a comparison between the frequencies of the sinusoidal component and the oscillatory response,
    wherein the rate at which the frequency of the sinusoidal component is changed is adjusted according to the control signal, so as to adapt the rate of frequency change to the region of the response spectrum being analysed.

2. A method according to claim 1 wherein the frequency of the sinusoidal component is changed smoothly with time.

3. A method according to claim 1 wherein:
    the drive signal has a plurality of sinusoidal components, the frequency of each sinusoidal component being changed with time, and
    the rate at which each frequency is changed being independently adjusted according to a respective control signal, so as to adapt the rate of frequency change of each sinusoidal component to the region of the response spectrum being analysed by that component.

4. A method according to of claim 1 wherein a plurality of oscillatory responses are measured for the or each sinusoidal component, and the step of providing the control signal includes comparing the frequencies of the sinusoidal component and each response.

5. A method according to claim 4 wherein the providing step further includes identifying the response which has the greatest frequency difference with the or each sinusoidal component and basing the control signal on that difference.

6. A method according to claim 4 wherein the providing step further includes calculating an average of the frequency differences between the sinusoidal component and the responses and basing the control signal on that average.

7. A method according to claim 1 further including the step of filtering the oscillatory response around the frequency of the sinusoidal component before the step of providing the control signal.

8. A method according to claim 1 wherein the system is a mechanical system.

9. A method according to claim 8 wherein the system is a gas turbine engine or a component thereof.

10. A test apparatus for analysing an oscillatable system, the apparatus including:
   a vibration controller for applying a drive signal to a system under test, the drive signal having at least one sinusoidal component which is changeable with time;
   a sensor for attachment to the system in order to measure an oscillatory response of said system; and
   a comparator which is adapted to provide a control signal to the vibration controller, the control signal being based on at least a comparison between the frequencies of the sinusoidal component and the oscillatory response,
   wherein the rate at which the frequency of the sinusoidal component is changed is adjustable according to the control signal, so as to adapt the rate of frequency change to the region of the response spectrum being analysed.

11. A control method for an oscillatable system including the steps of:
   applying a driving frequency to the system, the frequency being changed with time;
   measuring an oscillatory response of the system;
   comparing the driving frequency and the frequency of the oscillatory response; and
   adjusting the rate at which the driving frequency changes according to said comparison.

* * * * *